US 9,172,753 B1

(12) United States Patent
Jiang et al.

(10) Patent No.: US 9,172,753 B1
(45) Date of Patent: Oct. 27, 2015

(54) METHODS FOR OPTIMIZING HTTP HEADER BASED AUTHENTICATION AND DEVICES THEREOF

(75) Inventors: Paul Jiang, Saratoga, CA (US); Amit Jain, Santa Clara, CA (US); Satoshi Asami, San Jose, CA (US); Saxon Amdahl, Mountain View, CA (US)

(73) Assignee: F5 Networks, Inc., Seattle, WA (US)

( * ) Notice: Subject to any disclaimer, the term of this patent is extended or adjusted under 35 U.S.C. 154(b) by 395 days.

(21) Appl. No.: 13/400,398

(22) Filed: Feb. 20, 2012

(51) Int. Cl.
*G06F 15/16* (2006.01)
*H04L 29/08* (2006.01)

(52) U.S. Cl.
CPC ........ *H04L 67/1097* (2013.01); *H04L 67/2842* (2013.01)

(58) Field of Classification Search
CPC ........................................................ H04L 67/32
USPC ...................... 726/5, 3, 22; 713/155, 189, 182
See application file for complete search history.

(56) References Cited

U.S. PATENT DOCUMENTS

| | | |
|---|---|---|
| 3,950,735 A | 4/1976 | Patel |
| 4,644,532 A | 2/1987 | George et al. |
| 4,897,781 A | 1/1990 | Chang et al. |
| 4,965,772 A | 10/1990 | Daniel et al. |
| 5,023,826 A | 6/1991 | Patel |
| 5,053,953 A | 10/1991 | Patel |
| 5,167,024 A | 11/1992 | Smith et al. |
| 5,299,312 A | 3/1994 | Rocco, Jr. |
| 5,327,529 A | 7/1994 | Fults et al. |
| 5,367,635 A | 11/1994 | Bauer et al. |
| 5,371,852 A | 12/1994 | Attanasio et al. |
| 5,406,502 A | 4/1995 | Haramaty et al. |
| 5,475,857 A | 12/1995 | Dally |
| 5,517,617 A | 5/1996 | Sathaye et al. |
| 5,519,694 A | 5/1996 | Brewer et al. |
| 5,519,778 A | 5/1996 | Leighton et al. |

(Continued)

FOREIGN PATENT DOCUMENTS

| | | |
|---|---|---|
| EP | 0744850 A2 | 11/1996 |
| WO | WO 91/14326 | 9/1991 |

(Continued)

OTHER PUBLICATIONS

"Do's and Don'ts of Client Authentication on the Web"—Fu et al, MIT, Sep. 2011 http://pdos.csail.mit.edu/cookies/pubs/webauth:tr.pdf.*

(Continued)

*Primary Examiner* — Randy Scott
(74) *Attorney, Agent, or Firm* — LeClairRyan, a Professional Corporation

(57) ABSTRACT

A method, non-transitory computer readable medium and application management computing device includes receiving at an application management computing device a request from a client computing device which requires authentication. A determination is made by the application management computing device whether user network identification information currently is stored for the requesting client computing device. The stored user network identification information for the authentication is obtained by the application management computing device when the user network identification information is determined to be currently stored for the requesting client computing device. The authentication is completed by the application management computing device with the obtained user network identification information.

12 Claims, 2 Drawing Sheets

(56) References Cited

U.S. PATENT DOCUMENTS

| | | |
|---|---|---|
| 5,521,591 A | 5/1996 | Arora et al. |
| 5,528,701 A | 6/1996 | Aref |
| 5,581,764 A | 12/1996 | Fitzgerald et al. |
| 5,596,742 A | 1/1997 | Agarwal et al. |
| 5,606,665 A | 2/1997 | Yang et al. |
| 5,611,049 A | 3/1997 | Pitts |
| 5,663,018 A | 9/1997 | Cummings et al. |
| 5,752,023 A | 5/1998 | Choucri et al. |
| 5,761,484 A | 6/1998 | Agarwal et al. |
| 5,768,423 A | 6/1998 | Aref et al. |
| 5,774,660 A | 6/1998 | Brendel et al. |
| 5,790,554 A | 8/1998 | Pitcher et al. |
| 5,802,052 A | 9/1998 | Venkataraman |
| 5,812,550 A | 9/1998 | Sohn et al. |
| 5,825,772 A | 10/1998 | Dobbins et al. |
| 5,832,283 A | 11/1998 | Chou et al. |
| 5,875,296 A | 2/1999 | Shi et al. |
| 5,892,914 A | 4/1999 | Pitts |
| 5,892,932 A | 4/1999 | Kim |
| 5,919,247 A | 7/1999 | Van Hoff et al. |
| 5,936,939 A | 8/1999 | Des Jardins et al. |
| 5,941,988 A | 8/1999 | Bhagwat et al. |
| 5,946,690 A | 8/1999 | Pitts |
| 5,949,885 A | 9/1999 | Leighton |
| 5,951,694 A | 9/1999 | Choquier et al. |
| 5,959,990 A | 9/1999 | Frantz et al. |
| 5,974,460 A | 10/1999 | Maddalozzo, Jr. et al. |
| 5,983,281 A | 11/1999 | Ogle et al. |
| 5,988,847 A | 11/1999 | McLaughlin et al. |
| 6,006,260 A | 12/1999 | Barrick, Jr. et al. |
| 6,006,264 A | 12/1999 | Colby et al. |
| 6,026,452 A | 2/2000 | Pitts |
| 6,028,857 A | 2/2000 | Poor |
| 6,051,169 A | 4/2000 | Brown et al. |
| 6,078,956 A | 6/2000 | Bryant et al. |
| 6,085,234 A | 7/2000 | Pitts et al. |
| 6,092,196 A | 7/2000 | Reiche |
| 6,108,703 A | 8/2000 | Leighton et al. |
| 6,111,876 A | 8/2000 | Frantz et al. |
| 6,128,279 A | 10/2000 | O'Neil et al. |
| 6,128,657 A | 10/2000 | Okanoya et al. |
| 6,160,874 A | 12/2000 | Dickerman et al. |
| 6,170,022 B1 | 1/2001 | Linville et al. |
| 6,178,423 B1 | 1/2001 | Douceur et al. |
| 6,182,139 B1 | 1/2001 | Brendel |
| 6,192,051 B1 | 2/2001 | Lipman et al. |
| 6,233,612 B1 | 5/2001 | Fruchtman et al. |
| 6,246,684 B1 | 6/2001 | Chapman et al. |
| 6,253,226 B1 | 6/2001 | Chidambaran et al. |
| 6,253,230 B1 | 6/2001 | Couland et al. |
| 6,263,368 B1 | 7/2001 | Martin |
| 6,298,380 B1 | 10/2001 | Coile et al. |
| 6,327,622 B1 | 12/2001 | Jindal et al. |
| 6,343,324 B1 | 1/2002 | Hubis et al. |
| 6,347,339 B1 | 2/2002 | Morris et al. |
| 6,360,270 B1 | 3/2002 | Cherkasova et al. |
| 6,374,300 B2 | 4/2002 | Masters |
| 6,396,833 B1 | 5/2002 | Zhang et al. |
| 6,411,986 B1 | 6/2002 | Susai et al. |
| 6,430,562 B1 | 8/2002 | Kardos et al. |
| 6,434,081 B1 | 8/2002 | Johnson et al. |
| 6,480,476 B1 | 11/2002 | Willars |
| 6,484,261 B1 | 11/2002 | Wiegel |
| 6,490,624 B1 | 12/2002 | Sampson et al. |
| 6,510,135 B1 | 1/2003 | Almulhem et al. |
| 6,510,458 B1 | 1/2003 | Berstis et al. |
| 6,519,643 B1 | 2/2003 | Foulkes et al. |
| 6,601,084 B1 | 7/2003 | Bhaskaran et al. |
| 6,636,503 B1 | 10/2003 | Shiran et al. |
| 6,636,894 B1 | 10/2003 | Short et al. |
| 6,650,640 B1 | 11/2003 | Muller et al. |
| 6,650,641 B1 | 11/2003 | Albert et al. |
| 6,654,701 B2 | 11/2003 | Hatley |
| 6,683,873 B1 | 1/2004 | Kwok et al. |
| 6,691,165 B1 | 2/2004 | Bruck et al. |
| 6,694,517 B1 | 2/2004 | James et al. |
| 6,708,187 B1 | 3/2004 | Shanumgam et al. |
| 6,742,045 B1 | 5/2004 | Albert et al. |
| 6,751,663 B1 | 6/2004 | Farrell et al. |
| 6,754,228 B1 | 6/2004 | Ludwig |
| 6,760,775 B1 | 7/2004 | Anerousis et al. |
| 6,772,219 B1 | 8/2004 | Shobatake |
| 6,779,039 B1 | 8/2004 | Bommareddy et al. |
| 6,781,986 B1 | 8/2004 | Sabaa et al. |
| 6,798,777 B1 | 9/2004 | Ferguson et al. |
| 6,804,542 B1 | 10/2004 | Haartsen |
| 6,816,901 B1 | 11/2004 | Sitaraman et al. |
| 6,816,977 B2 | 11/2004 | Brakmo et al. |
| 6,829,238 B2 | 12/2004 | Tokuyo et al. |
| 6,868,082 B1 | 3/2005 | Allen, Jr. et al. |
| 6,876,629 B2 | 4/2005 | Beshai et al. |
| 6,876,654 B1 | 4/2005 | Hegde |
| 6,888,836 B1 | 5/2005 | Cherkasova |
| 6,928,082 B2 | 8/2005 | Liu et al. |
| 6,947,985 B2 | 9/2005 | Hegli et al. |
| 6,950,434 B1 | 9/2005 | Viswanath et al. |
| 6,954,780 B2 | 10/2005 | Susai et al. |
| 6,957,272 B2 | 10/2005 | Tallegas et al. |
| 6,959,394 B1 | 10/2005 | Brickell et al. |
| 6,975,592 B1 | 12/2005 | Seddigh et al. |
| 6,987,763 B2 | 1/2006 | Rochberger et al. |
| 7,007,092 B2 | 2/2006 | Peiffer |
| 7,113,993 B1 | 9/2006 | Cappiello et al. |
| 7,133,944 B2 | 11/2006 | Song et al. |
| 7,139,792 B1 | 11/2006 | Mishra et al. |
| 7,228,422 B2 | 6/2007 | Morioka et al. |
| 7,287,082 B1 | 10/2007 | O'Toole, Jr. |
| 7,295,827 B2 | 11/2007 | Liu et al. |
| 7,308,703 B2 | 12/2007 | Wright et al. |
| 7,321,926 B1 | 1/2008 | Zhang et al. |
| 7,333,999 B1 | 2/2008 | Njemanze |
| 7,343,413 B2 | 3/2008 | Gilde et al. |
| 7,349,391 B2 | 3/2008 | Ben-Dor et al. |
| 7,383,570 B2 * | 6/2008 | Pinkas et al. .................. 726/2 |
| 7,398,552 B2 | 7/2008 | Pardee et al. |
| 7,433,962 B2 | 10/2008 | Janssen et al. |
| 7,454,480 B2 | 11/2008 | Labio et al. |
| 7,490,162 B1 | 2/2009 | Masters |
| 7,500,269 B2 | 3/2009 | Huotari et al. |
| 7,505,795 B1 | 3/2009 | Lim et al. |
| 7,516,492 B1 | 4/2009 | Nisbet et al. |
| 7,526,541 B2 | 4/2009 | Roese et al. |
| 7,558,197 B1 | 7/2009 | Sindhu et al. |
| 7,580,971 B1 | 8/2009 | Gollapudi et al. |
| 7,624,424 B2 | 11/2009 | Morita et al. |
| 7,668,166 B1 | 2/2010 | Rekhter et al. |
| 7,680,915 B2 | 3/2010 | Still et al. |
| 7,724,657 B2 | 5/2010 | Rao et al. |
| 7,725,093 B2 | 5/2010 | Sengupta et al. |
| 7,778,187 B2 | 8/2010 | Chaturvedi et al. |
| 7,801,978 B1 | 9/2010 | Susai et al. |
| 7,831,662 B2 | 11/2010 | Clark et al. |
| 7,908,314 B2 | 3/2011 | Yamaguchi et al. |
| 7,925,908 B2 | 4/2011 | Kim |
| 7,933,946 B2 | 4/2011 | Livshits et al. |
| 7,945,908 B1 | 5/2011 | Waldspurger et al. |
| 8,130,650 B2 | 3/2012 | Allen, Jr. et al. |
| 8,199,757 B2 | 6/2012 | Pani et al. |
| 8,351,333 B2 | 1/2013 | Rao et al. |
| 8,380,854 B2 | 2/2013 | Szabo |
| 8,447,871 B1 | 5/2013 | Szabo |
| 8,464,265 B2 | 6/2013 | Worley |
| 8,606,921 B2 | 12/2013 | Vasquez et al. |
| 8,615,022 B2 | 12/2013 | Harrison et al. |
| 8,665,868 B2 | 3/2014 | Kay |
| 8,788,665 B2 | 7/2014 | Gilde et al. |
| 8,804,504 B1 | 8/2014 | Chen |
| 2001/0009554 A1 | 7/2001 | Katseff et al. |
| 2001/0023442 A1 | 9/2001 | Masters |
| 2002/0138615 A1 | 9/2002 | Schmeling |
| 2002/0161913 A1 | 10/2002 | Gonzalez et al. |
| 2002/0198993 A1 | 12/2002 | Cudd et al. |
| 2003/0046291 A1 | 3/2003 | Fascenda |
| 2003/0065951 A1 * | 4/2003 | Igeta et al. .................. 713/201 |

(56) References Cited

U.S. PATENT DOCUMENTS

| | | |
|---|---|---|
| 2003/0069918 A1 | 4/2003 | Lu et al. |
| 2003/0069974 A1 | 4/2003 | Lu et al. |
| 2003/0070069 A1 | 4/2003 | Belapurkar et al. |
| 2003/0086415 A1 | 5/2003 | Bernhard et al. |
| 2003/0105983 A1 | 6/2003 | Brakmo et al. |
| 2003/0108052 A1 | 6/2003 | Inoue et al. |
| 2003/0128708 A1 | 7/2003 | Inoue et al. |
| 2003/0145062 A1 | 7/2003 | Sharma et al. |
| 2003/0145233 A1 | 7/2003 | Poletto et al. |
| 2003/0163576 A1 | 8/2003 | Janssen et al. |
| 2003/0225485 A1 | 12/2003 | Fritz et al. |
| 2004/0003287 A1 | 1/2004 | Zissimopoulos et al. |
| 2004/0072569 A1 | 4/2004 | Omae et al. |
| 2004/0103283 A1 | 5/2004 | Hornak |
| 2004/0111523 A1 | 6/2004 | Hall et al. |
| 2004/0111621 A1* | 6/2004 | Himberger et al. .......... 713/182 |
| 2004/0117493 A1 | 6/2004 | Bazot et al. |
| 2004/0151186 A1 | 8/2004 | Akama |
| 2004/0264472 A1 | 12/2004 | Oliver et al. |
| 2004/0264481 A1 | 12/2004 | Darling et al. |
| 2004/0267920 A1 | 12/2004 | Hydrie et al. |
| 2004/0267948 A1 | 12/2004 | Oliver et al. |
| 2004/0268358 A1 | 12/2004 | Darling et al. |
| 2005/0004887 A1 | 1/2005 | Igakura et al. |
| 2005/0021736 A1 | 1/2005 | Carusi et al. |
| 2005/0044213 A1 | 2/2005 | Kobayashi et al. |
| 2005/0052440 A1 | 3/2005 | Kim et al. |
| 2005/0055435 A1 | 3/2005 | Gbadegesin et al. |
| 2005/0078604 A1 | 4/2005 | Yim |
| 2005/0122977 A1 | 6/2005 | Lieberman |
| 2005/0154837 A1 | 7/2005 | Keohane et al. |
| 2005/0187866 A1 | 8/2005 | Lee |
| 2005/0188220 A1 | 8/2005 | Nilsson et al. |
| 2005/0198310 A1 | 9/2005 | Kim et al. |
| 2005/0262238 A1 | 11/2005 | Reeves et al. |
| 2006/0031520 A1 | 2/2006 | Bedekar et al. |
| 2006/0059267 A1 | 3/2006 | Cugi et al. |
| 2006/0112176 A1 | 5/2006 | Liu et al. |
| 2006/0112272 A1 | 5/2006 | Morioka et al. |
| 2006/0156416 A1 | 7/2006 | Huotari et al. |
| 2006/0161577 A1 | 7/2006 | Kulkarni et al. |
| 2006/0171365 A1 | 8/2006 | Borella |
| 2006/0209853 A1 | 9/2006 | Hidaka et al. |
| 2006/0230148 A1 | 10/2006 | Forecast et al. |
| 2006/0233106 A1 | 10/2006 | Achlioptas et al. |
| 2006/0242300 A1 | 10/2006 | Yumoto et al. |
| 2007/0006293 A1 | 1/2007 | Balakrishnan et al. |
| 2007/0016662 A1 | 1/2007 | Desai et al. |
| 2007/0058670 A1 | 3/2007 | Konduru et al. |
| 2007/0064661 A1 | 3/2007 | Sood et al. |
| 2007/0083646 A1 | 4/2007 | Miller et al. |
| 2007/0088822 A1 | 4/2007 | Coile et al. |
| 2007/0106796 A1 | 5/2007 | Kudo et al. |
| 2007/0107048 A1 | 5/2007 | Halls et al. |
| 2007/0118879 A1 | 5/2007 | Yeun |
| 2007/0220598 A1 | 9/2007 | Salowey et al. |
| 2007/0233809 A1 | 10/2007 | Brownell et al. |
| 2007/0297551 A1 | 12/2007 | Choi |
| 2008/0025297 A1 | 1/2008 | Kashyap |
| 2008/0034136 A1 | 2/2008 | Ulenas |
| 2008/0072303 A1 | 3/2008 | Syed |
| 2008/0120370 A1 | 5/2008 | Chan et al. |
| 2008/0133518 A1 | 6/2008 | Kapoor et al. |
| 2008/0134311 A1 | 6/2008 | Medvinsky et al. |
| 2008/0148340 A1 | 6/2008 | Powell et al. |
| 2008/0159145 A1 | 7/2008 | Muthukrishnan et al. |
| 2008/0178278 A1 | 7/2008 | Grinstein et al. |
| 2008/0201599 A1 | 8/2008 | Ferraiolo et al. |
| 2008/0225710 A1 | 9/2008 | Raja et al. |
| 2008/0229415 A1 | 9/2008 | Kapoor et al. |
| 2008/0253395 A1 | 10/2008 | Pandya |
| 2008/0256224 A1 | 10/2008 | Kaji et al. |
| 2008/0301760 A1 | 12/2008 | Lim |
| 2009/0028337 A1 | 1/2009 | Balabine et al. |
| 2009/0049230 A1 | 2/2009 | Pandya |
| 2009/0070617 A1 | 3/2009 | Arimilli et al. |
| 2009/0077619 A1 | 3/2009 | Boyce |
| 2009/0094610 A1 | 4/2009 | Sukirya |
| 2009/0119504 A1 | 5/2009 | van Os et al. |
| 2009/0125496 A1 | 5/2009 | Wexler et al. |
| 2009/0125532 A1 | 5/2009 | Wexler et al. |
| 2009/0125625 A1 | 5/2009 | Shim et al. |
| 2009/0138749 A1 | 5/2009 | Moll et al. |
| 2009/0141891 A1 | 6/2009 | Boyen et al. |
| 2009/0196282 A1 | 8/2009 | Fellman et al. |
| 2009/0228956 A1 | 9/2009 | He et al. |
| 2009/0287935 A1 | 11/2009 | Aull et al. |
| 2009/0296624 A1 | 12/2009 | Ryu et al. |
| 2009/0300407 A1 | 12/2009 | Kamath et al. |
| 2010/0011434 A1 | 1/2010 | Kay |
| 2010/0017846 A1 | 1/2010 | Huang et al. |
| 2010/0023582 A1 | 1/2010 | Pedersen et al. |
| 2010/0071048 A1 | 3/2010 | Novak et al. |
| 2010/0115236 A1 | 5/2010 | Bataineh et al. |
| 2010/0122091 A1 | 5/2010 | Huang et al. |
| 2010/0150154 A1 | 6/2010 | Viger et al. |
| 2010/0165877 A1 | 7/2010 | Shukla et al. |
| 2010/0242092 A1 | 9/2010 | Harris et al. |
| 2010/0251330 A1 | 9/2010 | Kroeselberg et al. |
| 2010/0279733 A1 | 11/2010 | Karsten et al. |
| 2010/0322250 A1 | 12/2010 | Shetty et al. |
| 2010/0325277 A1 | 12/2010 | Muthiah et al. |
| 2011/0040889 A1 | 2/2011 | Garrett et al. |
| 2011/0047620 A1 | 2/2011 | Mahaffey et al. |
| 2011/0066718 A1 | 3/2011 | Susai et al. |
| 2011/0154443 A1 | 6/2011 | Thakur et al. |
| 2011/0173295 A1 | 7/2011 | Bakke et al. |
| 2011/0184733 A1 | 7/2011 | Yu et al. |
| 2011/0273984 A1 | 11/2011 | Hsu et al. |
| 2011/0282997 A1 | 11/2011 | Prince et al. |
| 2011/0321122 A1 | 12/2011 | Mwangi et al. |
| 2012/0039341 A1 | 2/2012 | Latif et al. |
| 2012/0041965 A1 | 2/2012 | Vasquez et al. |
| 2012/0063314 A1 | 3/2012 | Pignataro et al. |
| 2012/0066489 A1 | 3/2012 | Ozaki et al. |
| 2012/0101952 A1 | 4/2012 | Raleigh et al. |
| 2012/0317266 A1 | 12/2012 | Abbott |
| 2013/0336122 A1 | 12/2013 | Baruah et al. |
| 2014/0095661 A1 | 4/2014 | Knowles et al. |

FOREIGN PATENT DOCUMENTS

| | | |
|---|---|---|
| WO | WO 95/05712 | 2/1995 |
| WO | WO 97/09805 | 3/1997 |
| WO | WO 97/45800 | 12/1997 |
| WO | WO 99/05829 | 2/1999 |
| WO | WO 99/06913 | 2/1999 |
| WO | WO 99/10858 | 3/1999 |
| WO | WO 99/39373 | 8/1999 |
| WO | WO 99/64967 | 12/1999 |
| WO | WO 00/04422 | 1/2000 |
| WO | WO 00/04458 | 1/2000 |

OTHER PUBLICATIONS

F5 Networks Inc., "Configuration Guide for Local Traffic Management," F5 Networks Inc., Jan. 2006, version 9.2.2, 406 pgs.

Abad, C., et al., "An Analysis on the Schemes for Detecting and Preventing ARP Cache Poisoning Attacks", IEEE, Computer Society, 27th International Conference on Distributed Computing Systems Workshops (ICDCSW'07), 2007, pp. 1-8.

OWASP, "Testing for Cross site scripting", OWASP Testing Guide v2, Table of Contents, Feb. 24, 2011, pp. 1-5, (www.owasp.org/index.php/Testing_for_Cross_site_scripting).

International Search Report and The Written Opinion, for International Patent Application No. PCT/US2013/026615, Date of Mailing: Jul. 4, 2013.

"A Process for Selective Routing of Servlet Content to Transcoding Modules," Research Disclosure 422124, Jun. 1999, pp. 889-890, IBM Corporation.

F5 Networks, Inc., "BIG-IP Controller with Exclusive OneConnect Content Switching Feature Provides a Breakthrough System for

(56) References Cited

OTHER PUBLICATIONS

Maximizing Server and Network Performance," Press Release, May 8, 2001, 2 pages, Las Vegas, Nevada.

Crescendo Networks, "Application Layer Processing (ALP)," 2003-2009, pp. 168-186, Chapter 9, CN-5000E/5500E, Foxit Software Company.

Fielding et al., "Hypertext Transfer Protocol—HTTP/1.1," Network Working Group, RFC: 2068, Jan. 1997, pp. 1-162.

Fielding et al., "Hypertext Transfer Protocol—HTTP/1.1," Network Working Group, RFC: 2616, Jun. 1999, pp. 1-176, The Internet Society.

Floyd et al., "Random Early Detection Gateways for Congestion Avoidance," Aug. 1993, pp. 1-22, IEEE/ACM Transactions on Networking, California.

Hochmuth, Phil, "F5, CacheFlow pump up content-delivery lines," Network World Fusion, May 4, 2001, 1 page, Las Vegas, Nevada.

MacVitte, Lori., "Message-Based Load Balancing" F5 Technical Brief, pp. 1-9, 2009.

Schaefer, Ken, "IIS and Kerberos Part 5—Protocol Transition, Constrained Delegation, S4U2S and S4U2P," Jul. 18, 2007, 21 pages, http://www.adopenstatic.com/cs/blogs/ken/archive/2007/07/19/8460.aspx.

"Servlet/Applet/HTML Authentication Process With Single Sign-On," Research Disclosure 429128, Jan. 2000, pp. 163-164, IBM Corporation.

"Traffic Surges; Surge Queue; Netscaler Defense," 2005, PowerPoint Presentation, slides 1-12, Citrix Systems, Inc.

Williams et al., "The Ultimate Windows Server 2003 System Administrator's Guide: Forwarding Authentication," 2003, 2 pages, Figure 10.7, Addison-Wesley Professional, Boston, Massachusetts.

"Windows Server 2003 Kerberos Extensions," Microsoft TechNet, 2003 (Updated Jul. 31, 2004), http://technet.microsoft.com/en-us/library/cc738207, Microsoft Corporation.

U.S. Appl. No. 13/164,672 to Nat Thirasuttakorn, filed Jun. 20, 2011.
U.S. Appl. No. 13/234,042 to Baumann et al., filed Sep. 15, 2011.
U.S. Appl. No. 13/234,047 to Wojcik et al., filed Sep. 15, 2011.
U.S. Appl. No. 12/822,146 to Jeff Costlow, filed Jun. 23, 2010.
U.S. Appl. No. 13/235,276 to Hawthorne et al., filed Sep. 16, 2011.
U.S. Appl. No. 13/234,031 to Baumann et al., filed Sep. 15, 2011.
U.S. Appl. No. 13/165,783 to Jain et al., filed Jun. 21, 2011.

* cited by examiner

METHODS FOR OPTIMIZING HTTP HEADER BASED AUTHENTICATION AND DEVICES THEREOF

FIELD

This technology generally relates to methods and devices for authentication and, more particularly, to methods for optimizing HTTP header based authentication and devices thereof.

BACKGROUND

In the context of a transaction using HTTP, authentication is a method for a program or a web browser at a client computing device to provide user credentials which may include a user name and a password each time while making a request. A HTTP header based authentication requires a server to send back HTTP 401/407 challenge to browser for collecting user's authentication credentials or token. The general process which is followed is the web server sending a HTTP 401/407 challenge for each new TCP connection and web-browser replying with user's credentials or token as response to the challenge.

However, each 401/407 challenge attempt adds latency by creating one or more than one extra round trip time between the client and the server. It also adds to the processing overhead on server side as server needs to verify the received credential or token for each request.

SUMMARY

A method for optimizing authentication includes receiving at an application management computing device a request from a client computing device which requires authentication. A determination is made by the application management computing device whether user network identification information currently is stored for the requesting client computing device. On determining the presence of stored user network identification information for the authentication, the application management computing device obtains the stored user network identification information for the authentication. The authentication is completed by the application management computing device with the obtained user network identification information.

A non-transitory computer readable medium having stored thereon instructions for optimizing authentication comprising machine executable code which when executed by at least one processor, causes the processor to perform steps including receiving a request from a client computing device which requires authentication. A determination is made whether user network identification information currently is stored for the requesting client computing device. The stored user network identification information for the authentication is obtained when the user network identification information is determined to be currently stored for the requesting client computing device. The authentication is completed with the obtained user network identification information.

An application management computing device to optimize authentication includes at least one of configurable hardware logic configured to be capable of implementing and a processor coupled to a memory and configured to execute programmed instructions stored in the memory including receiving a request from a client computing device which requires authentication. A determination is made whether user network identification information currently is stored for the requesting client computing device. The stored user network identification information for the authentication is obtained when the user network identification information is determined to be currently stored for the requesting client computing device. The authentication is completed with the obtained user network identification information.

This technology provides a number of advantages including optimizing HTTP header based authentication. With this technology, the typical number of 401/407 challenges can be substantially reduced by utilizing a stored cookie comprising current authentication information at the client computing device. Accordingly, with this technology application management computing device utilization is optimized as the latency and the round trip time is reduced between the client computing device and the application management computing device. It also reduces the processing overhead on the application management computing device side as the application management computing device needs to verify the received credentials/token for reduced number of times.

DETAILED DESCRIPTION

Figure 1:
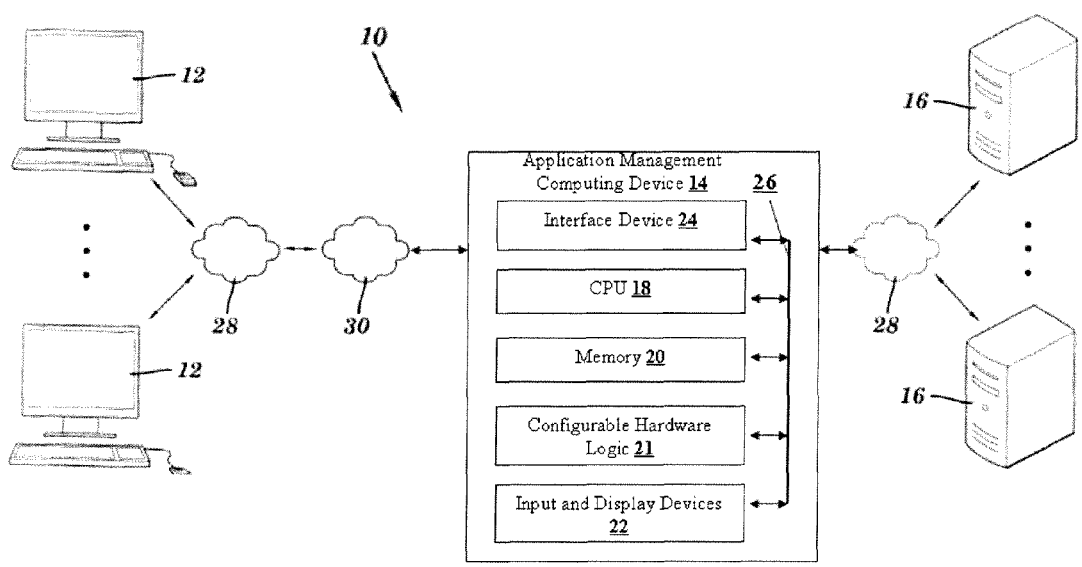
FIG. 1 is a block diagram of an exemplary network environment with an application management computing device for optimizing HTTP header based authentication.

An exemplary network environment 10 with an application management computing device 14 for optimizing HTTP header based authentication is illustrated in FIG. 1. The exemplary environment 10 includes client computing devices 12, the application management computing device 14, and servers 16 which are coupled together by local area networks (LANs) 28 and wide area network (WAN) 30, although the environment can include other types and numbers of devices, components, elements and communication networks in other topologies and deployments. While not shown, the exemplary environment 10 may include additional network components, such as routers, switches and other devices, which are well known to those of ordinary skill in the art and thus will not be described here. This technology provides a number of advantages including optimizing HTTP header based authentication.

Referring more specifically to FIG. 1, the application management computing device 14 is coupled to client computing devices 12 through one of the LANs 28, although the client computing devices 12 and application management computing device 14 may be coupled together via other topologies. Additionally, the application management computing device 14 is coupled to the servers 16 through the WAN 30 and another one of the LANs 28, although the servers 16 and the application management computing device 14 may be coupled together via other topologies.

The application management computing device 14 assists with optimizing authentication as illustrated and described with the examples herein, although application management computing device 14 may perform other types and numbers of functions. Application management computing device 14 includes at least one processor 18, memory 20, optional configurable hardware logic 21, I/O interface 22, and interface device 24 which are coupled together by bus 26, although application management computing device 14 may comprise other types and numbers of elements in other configurations.

Processor(s) 18 may execute one or more computer-executable instructions stored in the memory 20 for the methods illustrated and described with reference to the examples herein, although the processor(s) can execute other types and numbers of instructions and perform other types and numbers of operations. The processor(s) 18 may comprise one or more central processing units ("CPUs") or general purpose processors with one or more processing cores, such as AMD® processor(s), although other types of processor(s) could be used (e.g., Intel®).

Figure 2:
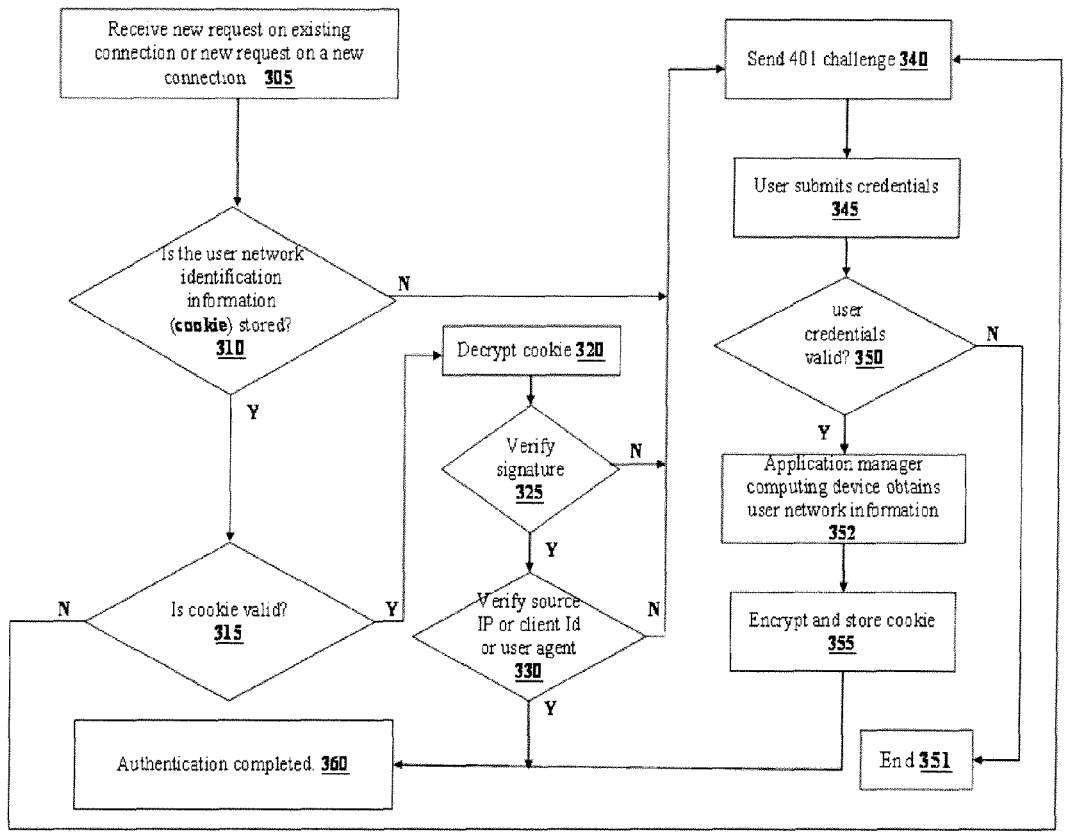
FIG. 2 is a flowchart of an exemplary method for optimizing authentication.

Memory 20 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. Memory 20 may store one or more non-transitory computer-readable instructions of this technology as illustrated and described with reference to the examples herein that may be executed by the one or more processor(s) 18. The flow chart shown in FIG. 2 is representative of example steps or actions of this technology that may be embodied or expressed as one or more non-transitory computer or machine readable instructions stored in memory 20 that may be executed by the processor(s) 18 and/or may be implemented by configured logic in the optional configurable hardware logic 21.

The configurable hardware logic 21 may comprise specialized hardware configured to implement one or more steps of this technology as illustrated and described with reference to the examples herein. By way of example only, the optional configurable hardware logic 21 may comprise one or more of field programmable gate arrays ("FPGAs"), field programmable logic devices ("FPLDs"), application specific integrated circuits (ASICs") and/or programmable logic units ("PLUs").

Input and display devices 22 enable a user, such as an administrator, to interact with the application management computing device 14, such as to input and/or view data and/or to configure, program and/or operate it by way of example only. Input devices may include a keyboard and/or a computer mouse and display devices may include a computer monitor, although other types and numbers of input devices and display devices could be used.

The interface device 24 in the application management computing device 14 is used to operatively couple and communicate between the application management computing device 14 and the client computing devices 12 and the servers 16 which are all coupled together by one or more of the local area networks (LAN) 28 and the wide area network (WAN) 30, although other types and numbers of communication networks or systems with other types and numbers of connections and configurations to other devices and elements. By way of example only, the local area networks (LAN) 28 and the wide area network (WAN) 30 can use TCP/IP over Ethernet and industry-standard protocols, including HTTP although other types and numbers of communication networks, can be used. In this example, the bus 26 is a hypertransport bus in this example, although other bus types and links may be used, such as PCI.

Each of the client computing devices 12 and the servers 16 include a central processing unit (CPU) or processor, a memory, an interface device, and an I/O system, which are coupled together by a bus or other link, although other numbers and types of network devices could be used. The client computing devices 12, in this example, may run interface applications, such as Web browsers, that may provide an interface to make requests for and send content and/or data to different server based applications at servers 16 via the LANs 28 and/or WANs 30. Additionally, in order for the client computing devices 12 to requests for content to one or more of the servers 16, each client computing device 12 may have to provide user network identification information for authentication.

Generally, servers 16 process requests received from requesting client computing devices 12 via LANs 28 and/or WAN 30 according to the HTTP-based application protocol in this example, but the principles discussed herein are not limited to this example and can include other application protocols. A series of applications may run on the servers 16 that allow the transmission of data, such as a data file or metadata, requested by the client computing devices 12. The servers 16 may provide data or receive data in response to requests directed toward the respective applications on the servers 16 from the client computing devices 12. It is to be understood that the servers 16 may be hardware or software or may represent a system with multiple servers 16, which may include internal or external networks. In this example the servers 16 may be any version of Microsoft® IIS servers or Apache® servers, although other types of servers may be used. Further, additional servers may be coupled to the LAN 28 and many different types of applications may be available on servers coupled to the LAN 28.

Although an exemplary network environment 10 with the client computing devices 12, the application management computing device 14, the servers 16, the LANs 28 and the WAN 30 are described and illustrated herein, other types and numbers of systems, devices, blades, components, and elements in other topologies can be used. It is to be understood that the systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An exemplary method for optimizing authentication will now be described with reference to FIGS. 1-2. In step 305, one of the client computing devices 12 may transmit a request which is received by the application management computing device 14 and requires authentication, although requests can be received from other types of devices and systems.

In step 310, the application management computing device 14 determines whether the user network identification information is currently present in the request received from the client computing device 12. This information is present in the request received from the client computing device 12 if the user network identification information stored in the memory of the client computing device 12, more particularly in the browser of the client computing device 12 in the form of a cookie in this example. By way of example only, the user network identification information stored in the form of a cookie may also be in different forms such as a flash cookie, a browser cookie or a general HTTP cookie, although the user network identification information may be stored in other manners.

If in step 310, the application management computing device 14 determines user network identification information is not currently stored, then the No branch is taken to step 340. In step 340, the application management computing device 14 sends one or more than one challenge message requiring client credentials, such as a HTTP challenge 401/407 requests, to the requesting one of the client computing devices 12, although other types of challenge messages can be sent to the client computing device 12 to obtain client credentials.

In step 345, the application management computing device 14 receives one or more user credential from the requesting one of the client computing devices 12 in response the challenge message. In this example, the received credentials include login credentials, such as username, password or tokens, although other types and numbers of credentials could be received.

Next, in step 350 the application management computing device 14 authenticates the received credentials by verifying with the corresponding one of the one or more servers 16 to which the request is directed, although other manners for authenticating the credentials could be used. If in step 350, the application management computing device 14 determines the received credentials from the requesting one of the client computing devices 12 are not authenticated, then the No branch is taken to step 351. In step 351, the application management computing device 14 transmits a denial of the request to the requesting one of the client computing devices 12 and this exemplary method ends.

If in step 350, the application management computing device 14 determines the received credentials from the requesting one of the client computing devices 12 are authenticated, then the Yes branch is taken to step 352. At step 352, the application management computing device 14 obtains the user network identification information user from the authenticated requesting one of the client computing devices 12. The user network identification information may be a user's internet protocol address, user's user agent string presented by the internet browser of the client computing device 12 and other network related properties of the internet browser of the client computing devices 12, although other types of network identification information could be used. The user network identification information is network identification information of the client computing device 12, which is obtained for the first time when the application management computing device 14 determines that the cookie is not present in the browser of the client computing device 12.

In step 355, the application management computing device 14 may encrypt the user network identification information by using an encryption key. By way of example, the encryption key may be unique to each user or can be common to all users. Optionally, the application management computing device 14 may store the user network identification information in its own memory 20. The application management computing device 14 then can create a unique identifier that enables it to lookup user network identification information in its memory 20 and can encrypt this unique identifier by using the encryption key.

In step 360, the application management computing device 14 transmits the encrypted value as a cookie to the requesting client computing device 12 where it is stored in the browser of the client computing device 12 and then the initial authentication is completed. For all subsequent requests, the application management computing device 14 may use the cookie stored in the browser of the client computing device 12 to authenticate the requests Referring back to step 305, the one of the client computing devices 12 which previously transmitted a request may transmit another request which is received by the application management computing device 14 and requires authentication, although requests can be received from other types of devices and systems In step 310, the application management computing device 14 determines whether the user network identification information is currently stored in the request received from the internet browser of the client computing device 12. Accordingly, in this pass through step 310 the application management computing device 14 determines the user network identification information is currently stored in the browser of the requesting one of the client computing devices so the Yes branch is taken to step 315.

In step 315, the application management computing device 14 obtains the cookie from the received request of the client computing devices 12 and determines whether the cookie is valid. If in step 315, the application management computing device 14 determines the obtained cookie is invalid, then the No branch is taken to step 340 as described earlier.

If in step 315, the application management computing device 14 determines the obtained cookie is valid, then the Yes branch is taken to step 320. In step 320, the application management computing device 14 decrypts the obtained cookie to obtain the user network identification information.

In step 325, the application management computing device 14 determines whether a signature of the decrypted cookie is valid. If in step 325, the application management computing device 14 determines the signature in the decrypted cookie is not valid, then the No branch is taken to step 340 as described earlier.

If in step 325, the application management computing device 14 determines the signature in the decrypted user network identification information is verified, then the Yes branch is taken to step 330. In step 330, the application management computing device 14 first obtains the verification user network identification information from the client computing device 12 from which the request was sent and determines whether in the decrypted user network identification information, such as client's ip, unique client id, ssl session id, or other identifiers which is stored in the cookie is same as the verification user network identification information. The verification of the user network identification information is network identification information of the requesting client computing device 12, such as client's identification protocol (client's ip), user session information etc. Since, the cookie is already stored once in the browser of the client computing device 12 based on the previous communication with the application management computing device 14, the application management computing device 14 additionally obtains the network information of the requesting client computing device 12 in the form of verification of the user network identification information to compare with the information contained in the previously stored cookie. If in step 330, the application management computing device 14 determines the decrypted user network identification information stored in the already existing cookie is not the same the verified user network identification which is the user network identification information of the client computing device 12 from which the new request is received, then the No branch is taken to step 340 as described earlier. If in step 330, the application management computing device 14 determines the user network identification information in the cookie is same as the verified user network identification, then the Yes branch is taken to step 360 as described earlier.

In one exemplary method of the present disclosure, the cookie stored in the browser of the client computing device 12 may be valid for or could be used by the application management computing device 14 to service the subsequent requests for a particular user session of the requesting client computing device 12, wherein the client computing devices 12 may be required to obtain a new cookie by following the steps 340 to 355 as described above to authenticate a transaction after termination of the user session.

In another exemplary method of the present disclosure, the cookie stored in the browser of the client computing device 12 may be valid for or could be used by the application management computing device 14 to service the subsequent requests for a particular number of transactions of the requesting client computing device 12, wherein the client computing devices 12 may be required to obtain a new cookie by following steps 340 to 355 as described above to authenticate a transaction after the reaching the maximum number of transactions.

In another exemplary method of the present disclosure, the cookie stored in the browser of the client computing device 12 may be valid for or could be used by the application management computing device 14 to service the subsequent requests for a particular interval of time, wherein the client computing devices 12 may be required to obtain a new cookie by following steps 340 to 355 as described above to authenticate a transaction after the termination of the time interval.

Accordingly, as illustrated and described with the examples herein, this technology provides a number of advantages including optimizing HTTP header based authentication. With this technology, the typical number of 401/407 challenges can be substantially reduced by utilizing a stored cookie comprising current authentication information at the application management computing device. Accordingly, with this technology server utilization is optimized as the latency and the round trip time is reduced between the client computing device and the server. It also reduces the processing overhead on the server side as the server needs to verify the received credentials/token only once

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for optimizing authentication, the method comprising:
   receiving by an application management computing device a request from a client computing device which requires authentication;
   determining by the application management computing device when the request includes an authentication cookie;
   authenticating by the application management computing device the client computing device based on a comparison of a set of user network identification information obtained from the authentication cookie to another set of user network identification information obtained from the request, when the determining indicates that the request includes the authentication cookie; and
   sending by the application management computing device a challenge to the client computing device, authenticating the client computing device based on user credentials received in response to the challenge, obtaining the another set of user network identification information from the request, generating the authentication cookie based on the another set of user network identification information, and sending the authentication cookie to the client computing device, when the determining indicates that the request does not include the authentication cookie information.

2. The method as set forth in claim 1 wherein the obtaining the user network identification information from the authentication cookie further comprises decrypting the user network identification information and the storing the user network identification information further comprises encrypting the user network identification information.

3. The method as set forth in claim 1 further comprises verifying by the application management computing device the user network identification information obtained from the authentication cookie before the completing the authentication.

4. The method as set forth in claim 1 further comprising obtaining by the application management computing device additional user network identification information from the requesting client computing device when the comparison does not indicate a match.

5. A non-transitory computer readable medium having stored thereon instructions for optimizing authentication comprising machine executable code which when executed by at least one processor, causes the processor to perform steps comprising:
   receiving a request from a client computing device which requires authentication;
   determining when the request includes an authentication cookie;
   authenticating the client computing device based on a comparison of a set of user network identification information obtained from the authentication cookie to another set of user network identification information obtained from the request, when the determining indicates that the request includes the authentication cookie; and
   sending a challenge to the client computing device, authenticating the client computing device based on user credentials received in response to the challenge, obtaining the another set of user network identification information from the request, generating the authentication cookie based on the another set of user network identification information, and sending the authentication cookie to the client computing device, when the determining indicates that the request does not include the authentication cookie.

6. The medium as set forth in claim 5 wherein the obtaining the user network identification information from the authentication cookie further comprises decrypting the user network identification information and the storing the user network identification information further comprises encrypting the user network identification information.

7. The medium as set forth in claim 5 further comprises verifying the user network identification information obtained from the authentication cookie before the completing the authentication.

8. The medium as set forth in claim 5 further comprising obtaining additional user network identification information from the requesting client computing device when the comparison does not indicate a match.

9. An application management computing device comprising at least one processor and a memory coupled to the processor which is configured to be capable of executing programmed instructions comprising and stored in the memory to:
   receive a request from a client computing device which requires authentication;
   determine when the request includes an authentication cookie;
   authenticate the client computing device based on a comparison of a set of user network identification information obtained from the authentication cookie to another set of user network identification information obtained from the request, when the determining indicates that the request includes the authentication cookie; and
   send a challenge to the client computing device, authenticating the client computing device based on user credentials received in response to the challenge, obtaining the another set of user network identification information from the request, generating the authentication cookie based on the another set of user network identification information, and sending the authentication cookie to the client computing device, when the determining indicates that the request does not include the authentication cookie.

10. The device as set forth in claim 9 wherein the obtaining the user network identification information from the authentication cookie comprises decrypting the user network identification information and the storing the user network identification information further comprises encrypting the user network identification information.

11. The device as set forth in claim 9 wherein the processor coupled to the memory is further configured to be capable of executing at least one additional programmed instruction to verify the user network identification information obtained from the authentication cookie before the completing the authentication.

12. The device as set forth in claim 9 wherein the processor coupled to the memory is further configured to be capable of executing at least one additional programmed instruction to obtain additional user network identification information from the requesting client computing device when the comparison does not indicate a match.

* * * * *